US009152827B2

(12) United States Patent
Linderman et al.

(10) Patent No.: US 9,152,827 B2
(45) Date of Patent: Oct. 6, 2015

(54) APPARATUS FOR PERFORMING MATRIX VECTOR MULTIPLICATION APPROXIMATION USING CROSSBAR ARRAYS OF RESISTIVE MEMORY DEVICES

(71) Applicant: The United States of America as represented by the Secretary of the Air Force, Washington, DC (US)

(72) Inventors: Richard Linderman, Rome, NY (US); Qing Wu, Manlius, NY (US); Garrett Rose, Clinton, NY (US); Hai Li, Pittsburg, PA (US); Yiran Chen, Pittsburg, PA (US); Miao Hu, Pittsburg, PA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 309 days.

(21) Appl. No.: 13/965,459

(22) Filed: Aug. 13, 2013

(65) Prior Publication Data
US 2014/0172937 A1    Jun. 19, 2014

Related U.S. Application Data

(60) Provisional application No. 61/848,775, filed on Dec. 19, 2012.

(51) Int. Cl.
*G06G 7/00* (2006.01)
*G06G 7/16* (2006.01)
*G06N 3/04* (2006.01)
*G06N 3/063* (2006.01)

(52) U.S. Cl.
CPC ............... *G06G 7/16* (2013.01); *G06N 3/0445* (2013.01); *G06N 3/0635* (2013.01)

(58) Field of Classification Search
CPC ...... G06G 7/16; G06N 3/0445; G06N 3/0635
USPC ........................................................ 708/801
See application file for complete search history.

(56) References Cited

U.S. PATENT DOCUMENTS

| 5,479,579 | A  | * | 12/1995 | Duong et al. | 706/36 |
| 8,856,055 | B2 | * | 10/2014 | Brezzo et al. | 706/33 |
| 2007/0233761 | A1 | * | 10/2007 | Mouttet | 708/204 |
| 2013/0028004 | A1 | * | 1/2013 | Snider | 365/148 |
| 2013/0132314 | A1 | * | 5/2013 | Snider | 706/15 |

* cited by examiner

*Primary Examiner* — Tan V. Mai
(74) *Attorney, Agent, or Firm* — Joseph A Mancini (57) ABSTRACT

An apparatus that performs the mathematical matrix-vector multiplication approximation operations using crossbar arrays of resistive memory devices (e.g. memristor, resistive random-access memory, spintronics, etc.). A crossbar array formed by resistive memory devices serves as a memory array that stores the coefficients of a matrix. Combined with input and output analog circuits, the crossbar array system realizes the method of performing matrix-vector multiplication approximation operations with significant performance, area and energy advantages over existing methods and designs. This invention also includes an extended method that realizes the auto-associative neural network recall function using the resistive memory crossbar architecture.

17 Claims, 5 Drawing Sheets

APPARATUS FOR PERFORMING MATRIX VECTOR MULTIPLICATION APPROXIMATION USING CROSSBAR ARRAYS OF RESISTIVE MEMORY DEVICES

PRIORITY CLAIM UNDER 35 U.S.C. §119(e)

This patent application claims the priority benefit of the filing date of provisional application Ser. No. 61/848,775 having been filed in the United States Patent and Trademark Office on Dec. 19, 2012 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

Matrix-vector multiplication is one of the most commonly used mathematical operations in science and engineering computations. Mathematically, a matrix is usually represented by a two-dimensional array of real numbers, and a vector is represented by a one-dimensional array of real numbers. Since a matrix can be viewed as an array of vectors, the matrix-vector multiplication operation can be generalized to vector-vector multiplication (inner product) or matrix-matrix multiplication operations. In today's computer systems, matrix-vector multiplication operations are performed by digital integrated circuits, in which the numbers are represented in binary format and the computation is performed by Boolean logic circuits.

The existence of resistive memory devices, such as the memristor, resistive random-access memory (RRAM), and spintronic switches, were predicted in circuit theory nearly forty years ago. However, it wasn't until 2008 that the first physical realization was demonstrated by HP Labs through a $TiO_2$ thin-film structure. Afterward, many resistive memory materials and devices have been reported or rediscovered. The resistive memory device has many promising features, such as non-volatility, low-power consumption, high integration density, and excellent scalability. More importantly, the unique property to record the historical profile of the excitations on the device makes it an ideal candidate to perform storage and computation functions in one device.

For the purpose of succinct description, the present invention uses the terminology "memristor" to represent the category of "resistive memory device". For the remainder of the patent description, references to "memristor" shall be regarded as referring to any "resistive memory device".

Based on circuit theory, an ideal memristor with memristance M builds the relationship between the magnetic flux $\phi$ and electric charge q that passes through the device, that is, $d\phi = M \cdot dq$. Since the magnetic flux and the electric charge are time dependent parameters, the instantaneous memristance varies with time and reflects the historical profile of the excitations through the device.

When developing actual memristive devices, many materials have demonstrated memristive behavior in theory and/or experimentation via different mechanisms. In general, a certain energy (or threshold voltage) is required to enable a state change in a memristor. When the electrical excitation through a memristor is greater than the threshold voltage, e.g., $|v_{in}| > |v_{th}|$, the memristance changes. Otherwise, the memristor behaves like a resistor.

OBJECTS AND SUMMARY OF THE INVENTION

It is therefore an object of the present invention to provide an apparatus that performs mathematical matrix-vector multiplication approximation.

It is a further object of the present invention to provide an apparatus that utilizes resistive memory devices to store matrix coefficients so as to facilitate matrix-vector multiplication approximation.

It is yet a further object of the present invention to apply matrix-vector multiplication approximation to facilitate auto-associative neural network recall functionality.

Briefly stated, the present invention is an apparatus that performs mathematical matrix-vector multiplication approximation operations using crossbar arrays of resistive memory devices (e.g. memristor, resistive random-access memory, spintronics, etc.). A crossbar array formed by resistive memory devices serves as a memory array that stores the coefficients of a matrix. Combined with input and output analog circuits, the crossbar array system realizes the method of performing matrix-vector multiplication approximation with significant performance, area and energy advantages over existing methods and designs. This invention also includes an extended method that realizes the auto-associative neural network recall function using the resistive memory crossbar architecture.

SUMMARY OF THE INVENTION

In this invention, we describe a matrix-vector multiplication approximation hardware method and design based on crossbar arrays of resistive memory devices.

By nature, the memristor crossbar array is attractive for the implementation of matrix-vector multiplication operations. The crossbar array inherently provides capabilities for this type of operation. In this invention, we focus on a hardware architecture and realization of the matrix-vector multiplication approximation assuming all of the memristors have been pre-programmed to store the elements of the matrix. During the multiplication operations, the voltages across the memristors are constrained below the threshold voltage so that all the memristance values remain unchanged. The crossbar architecture can naturally transfer the weighted combination (matrix) of input voltages (input vector) to output voltages (output vector). We also describe a fast approximation mapping method so that the matrix can be mapped to pure circuit element relations.

Figure 1:
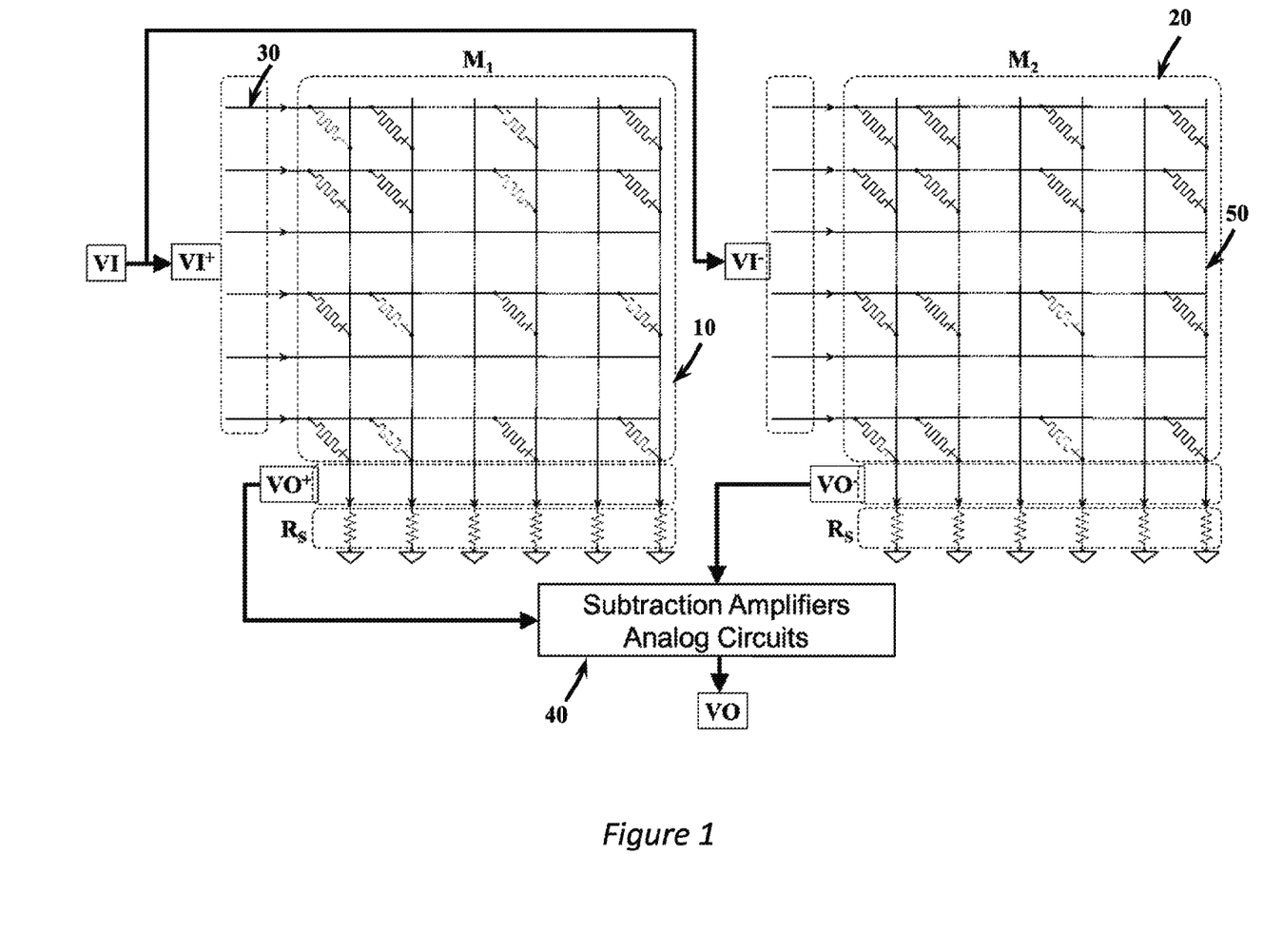
FIG. 1 depicts the two crossbar arrays of memristive devices and subtraction amplifier used by the present invention to perform matrix-vector multiplication approximation.

As shown in FIG. 1, the proposed hardware method and design includes two crossbar arrays of resistive memory devices, $M_1$ 10 for positive elements of the matrix and $M_2$ 20 for negative elements of the matrix. The input vector is represented by the input voltages VI that are driving the row (horizontal) wires 30 of the crossbar arrays. The matrix-vector multiplication approximation resulting vector is represented by the outputs VO of the analog subtraction amplifier circuits 40 connected to the column (vertical) wires 50 of the crossbar arrays.

Figure 4:
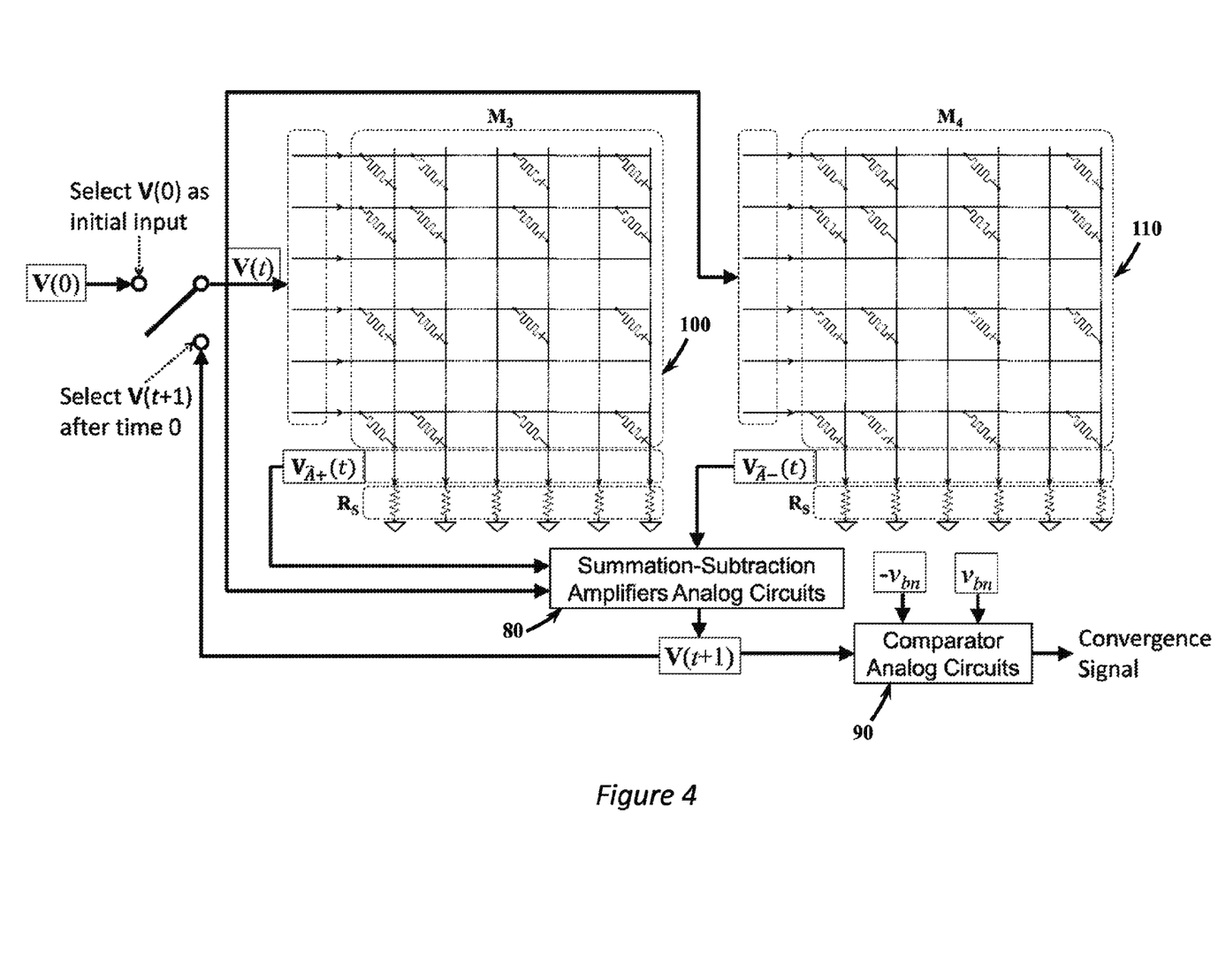
FIG. 4 depicts an alternate embodiment of the present invention employing the auto-associative neural network recall function.
Figure 5:
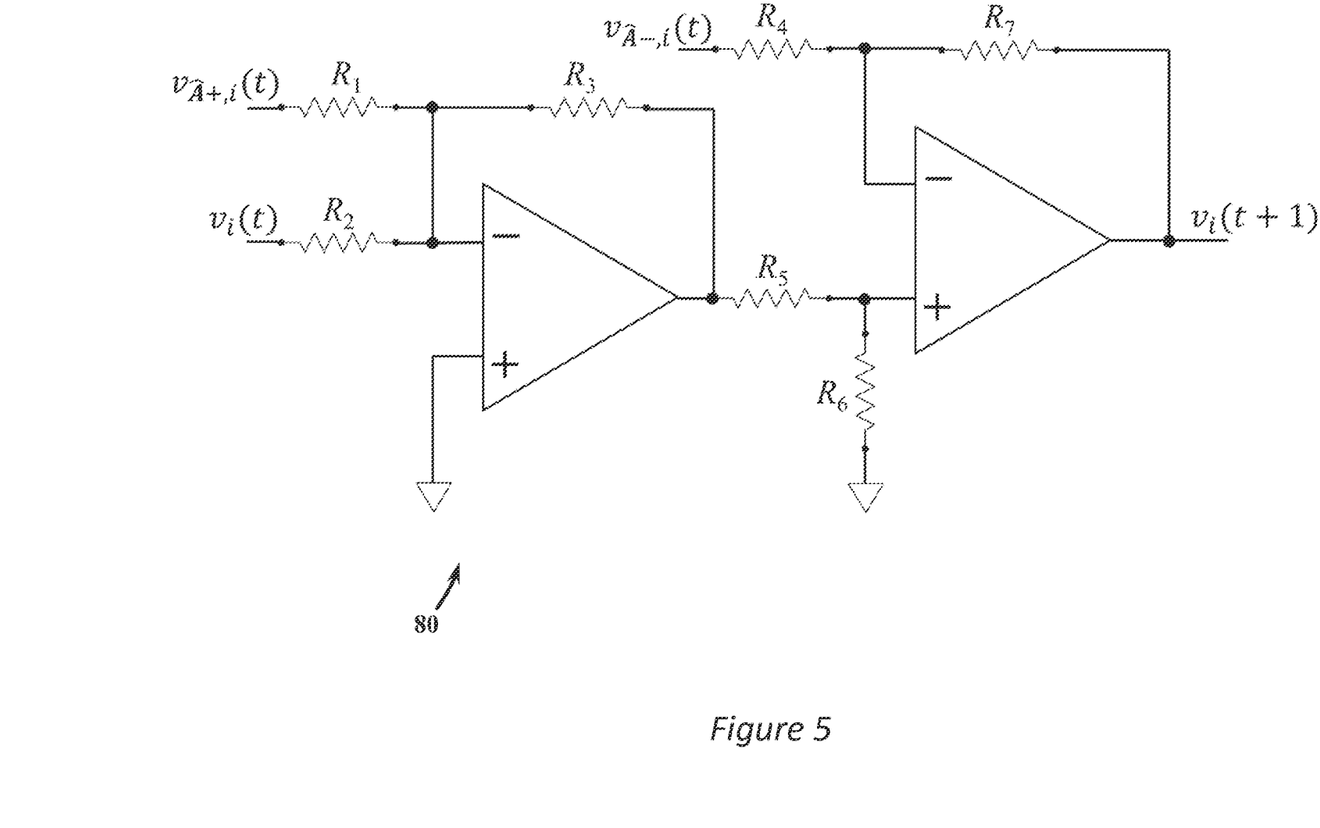
FIG. 5 depicts the circuit schematic of the summation-subtraction amplifier circuit used in the alternate embodiment of the present invention.

This invention also includes an extended method and design that realizes the auto-associative neural network recall function using the resistive memory crossbar architecture (see FIG. 4 and FIG. 5). The Brain-State-in-a-Box (BSB) model recall operation will be used as an example to illustrate the method.

DETAILED DESCRIPTION OF THE PREFERRED EMBODIMENT

A. Crossbar Array Implementation of Matrix

Figure 2:
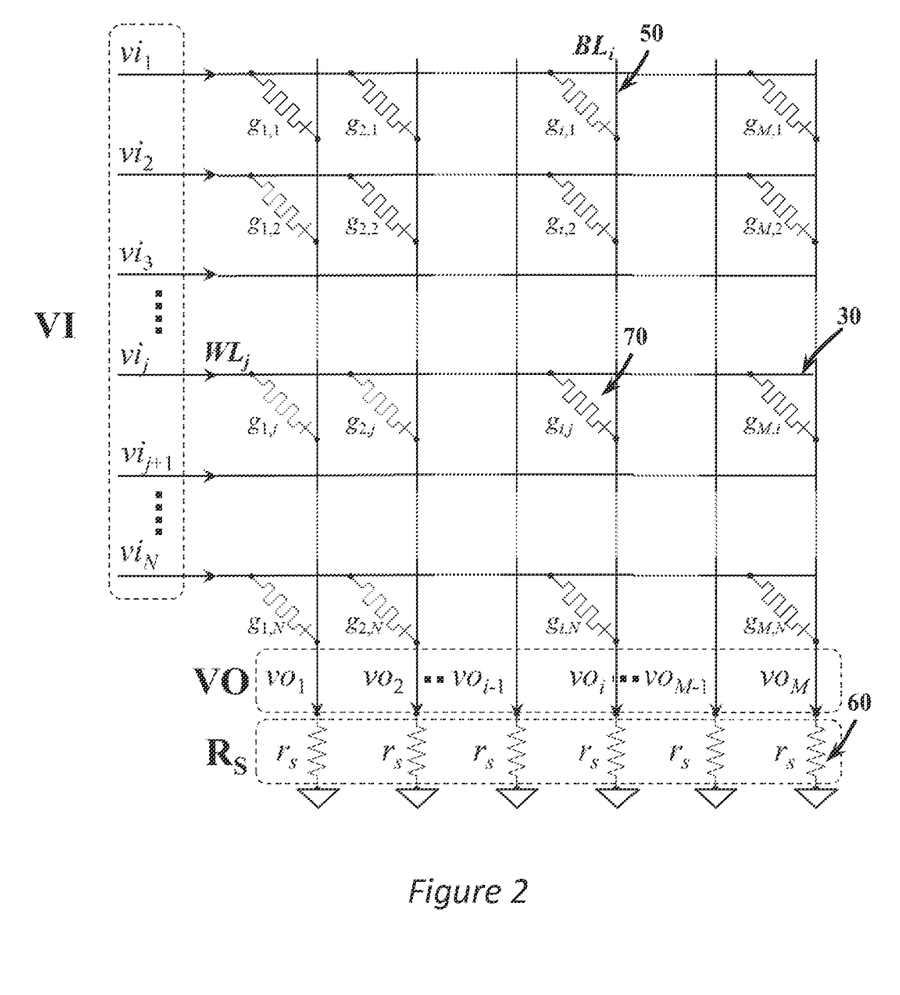
FIG. 2 depicts a single crossbar array used in the present invention showing more clearly the word lines, bit lines, and the connection of memristive devices between them.

Referring to FIG. 2, the present invention uses an N-by-M memristor crossbar array as a basic building block to achieve matrix-vector multiplication approximation computation functionality.

A set of input voltages $VI^T = \{vi_1, vi_2, \ldots, vi_N\}$ are applied on each of the N word-lines (WLs) 30 of the array, and the current is collected through each of the M bit-lines (BLs) 50 by measuring the voltage across a sensing resistor 60. The same sensing resistors are used on all the BLs with resistance $r_s$, or conductance $g_s = 1/r_s$. The output voltage vector is $VO^T = \{vo_1, vo_2, \ldots, vo_M\}$. Assume the memristive device (i.e., memristor) 70 sitting on the connection between $WL_j$ and $BL_i$ has a memristance of $m_{i,j}$. The corresponding conductance is $g_{i,j} = 1/m_{i,j}$. Then the relation between the input and output voltages can be approximated by:

$$VO \cong C \times VI \qquad (1)$$

Here, C is an MA-by-N matrix that can be represented by the memristors 70 and the sensing (load) resistors 60 as:

$$C = D \times G = \text{diag}(d_1, \ldots, d_M) \times \begin{bmatrix} g_{1,1} & \cdots & g_{1,N} \\ g_{2,1} & & g_{2,N} \\ \vdots & \ddots & \vdots \\ g_{M,1} & \cdots & g_{M,N} \end{bmatrix} \qquad (2)$$

where D is a diagonal matrix with diagonal elements of:

$$d_i = 1/(g_s + \Sigma_{k=1}^{N} g_{i,k}) \, i = 1, 2, \ldots, M. \qquad (3)$$

Eq. (1) indicates that a trained memristor crossbar array can be used to construct the connection matrix C, and transfer the input vector VI to the output vector VO. However, Eq. (2) shows that C is not a direct one-to-one mapping of conductance matrix G of the memristor crossbar array, since the diagonal matrix D is also a function of G. We have two methods to obtain the solution of G: an complex numerical iteration method to obtain the exact mathematical solution of G, and a simple approximation useful for frequent or resource constrained updates. In this invention we adopt the second method, which is described next.

In this section we first show how to map C to G when $c_{i,j}$ is in the range of [0, 1.0]. In the next section we will show the method of mapping a general matrix A with both positive and negative elements.

We assume any $g_{i,j} \in G$ satisfies $g_{min} \leq g_{i,j} \leq g_{max}$, where $g_{min}$ and $g_{max}$ respectively represent the minimum and the maximum conductance of all memristors in the crossbar array.

Instead, we propose a simple and fast approximation to the mapping problem by allowing:

$$g_{i,j} = c_{i,j} \cdot (g_{max} - g_{min}) + g_{min} \qquad (4)$$

In the following, we will prove that by using this mapping method, a scaled version $\hat{C}$ of the connection matrix C can be approximately mapped to the conductance matrix G of the memristor array.

PROOF. By plugging Eq. (4) into Eq. (3), we have:

$$\hat{c}_{i,j} = \frac{c_{i,j} \cdot (g_{max} - g_{min}) + g_{min}}{g_s + N \cdot g_{min} + (g_{max} - g_{min}) \cdot \sum_{k=1}^{N} c_{i,k}} \qquad (5)$$

Note that many memristor materials, such as the $TiO_2$ memristor, demonstrate a large $g_{max}/g_{min}$ ratio. Thus, a memristor at the high resistance state under a low voltage excitation can be regarded as an insulator, that is, $g_{min} \cong 0$. And $\Sigma_{k=1}^{N} c_{i,k}$ can be further reduced by increasing the ratio of $g_s/g_{max}$. As a result, the impact of $\Sigma_{k=1}^{N} c_{i,k}$ can be ignored. These two facts indicate that Eq. (5) can be further simplified to:

$$\hat{c}_{i,j} = c_{i,j} \cdot \frac{g_{max}}{g_s} \qquad (6)$$

In summary, with the proposed mapping method, the memristor crossbar array performs as a scaled connection matrix $\hat{C}$ between the input and output voltage signals.

B. Transformation of Matrix

In this section we describe the method of mapping from a matrix A to the memristor conductances G, under the condition that $a_{i,j}$ is in the range from $-1.0$ to $+1.0$. In the general case, we can scale any given matrix to the $[-1.0, 1.0]$ range, then perform the operation, and finally scale the resulting outputs back to the original range.

Given a matrix A with all its elements scaled to the range of $[-1.0, 1.0]$, we first split the positive and negative elements of A into two matrixes $A^+$ and $A^-$ as:

$$a_{i,j}^+ = \begin{cases} a_{i,j}, & \text{if } a_{i,j} > 0 \\ 0, & \text{if } a_{i,j} \leq 0 \end{cases}, \text{ and} \qquad (7a)$$

$$a_{i,j}^- = \begin{cases} 0, & \text{if } a_{i,j} > 0 \\ -a_{i,j}, & \text{if } a_{i,j} \leq 0 \end{cases}. \qquad (7b)$$

As such, a general matrix-vector multiplication approximation becomes:

$$VO = A \cdot VI = A^+ \cdot VI - A^- \cdot VI \qquad (8)$$

Here, the two matrices $A^+$ and $A^-$ can be mapped to two memristor crossbar arrays $M_1$ and $M_2$ in a scaled version $\hat{A}^+$ and $\hat{A}^-$, respectively, by combining the mapping method in Eq. (4) with Eq. (7a) and (7b) as follows.

$$\text{For } M_1: \ g_{i,j} = \begin{cases} a_{i,j} \cdot (g_{max} - g_{min}) + g_{min}, & \text{if } a_{i,j} > 0.0 \\ g_{min}, & \text{if } a_{i,j} \leq 0.0 \end{cases} \qquad (9)$$

$$\text{For } M_2: g_{i,j} = \begin{cases} -a_{i,j} \cdot (g_{max} - g_{min}) + g_{min}, & \text{if } a_{i,j} < 0.0 \\ g_{min}, & \text{if } a_{i,j} \geq 0.0 \end{cases} \quad (10)$$

C. Circuit Realization of Matrix-Vector Multiplication

To realize the matrix-vector multiplication approximation function y=A·x at the circuit level, the elements of the input vector x are converted to the range of input voltage levels VI. The corresponding functions for the multiplication approximation can be expressed as:

$$VO = \frac{g_s}{g_{max}}(VO^+ - VO^-) \quad (11)$$

where $VO^+ = \hat{A}^+ \cdot VI$ and $VO^- = \hat{A}^- \cdot VI$ (12)

where $VI = \frac{v_{bn}}{|x_{max}|} \cdot x$ (13)

where $|x_{max}|$ is the maximum possible magnitude of any element of input vector x, and $v_{bn}$ is the input voltage boundary, that is, $-v_{bn} \leq vi_j \leq v_{bn}$ for any $vi_j \in VI$. In implementation, $v_{bn}$ must be smaller than $v_{th}$ so that the memristance values will not change during the multiplication operation.

As shown in FIG. 1, the memristor crossbar arrays 10, 20 are used to realize the matrix-vector multiplication approximation operation. To obtain both positive and negative elements in the matrix, two memristor crossbar arrays $M_1$ 10 and $M_2$ 20 are required in the design to represent the positive and negative matrices $\hat{A}^+$ and $\hat{A}^-$, respectively. The memristor crossbar arrays have the same dimensions as the transposed matrix A.

Figure 3:
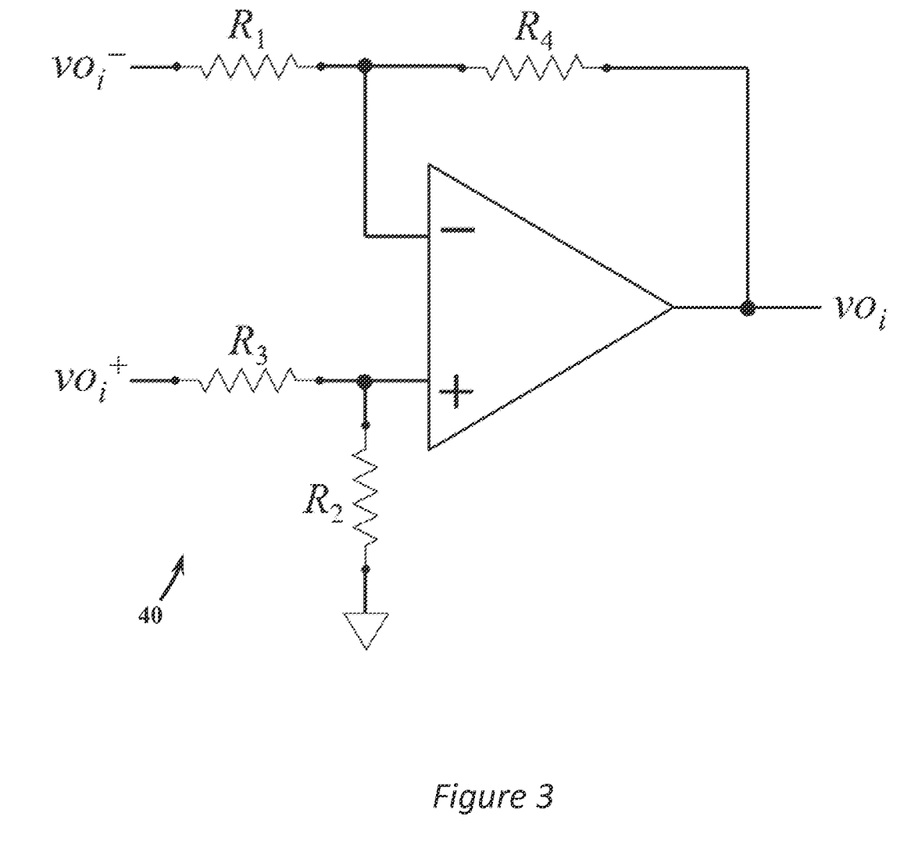
FIG. 3 depicts the circuit schematic of the subtraction amplifier used in the preferred embodiment of the present invention.

In the present invention, the input signal VI along with $VO^+$ and $VO^-$, the corresponding voltage outputs of two memristor crossbar arrays, are fed into a number of analog subtraction amplifier circuits 40. The design of the subtraction amplifier 40 is shown in FIG. 3.

Resulting from the scaled mapping method, the required VO should be $g_s/g_{max}$ times the generated $VO^+$ or $VO^-$. In the present invention, we set $R_1=R_2=1/g_s$ and $R_3=R_4=1/g_{max}$. The resulting output of the subtraction amplifier 40 is:

$$vo_i = \frac{g_s}{g_{max}} \cdot vo_i^+ - \frac{g_s}{g_{max}} \cdot vo_i^- \quad (14)$$

which indicates that the scaled effect (caused by mapping from A to $\hat{A}^+$ and $\hat{A}^-$) has been canceled out. The M-by-N dimensional matrix requires M summing amplifiers 40 to realize the subtraction operation in Eq. (14). Also, for subtraction amplifiers 40, we should adjust their power supplies to make their maximum/minimum output voltages to reflect the same scaling factor when converting the input vector x to voltage VI. Finally the resulting vector y can be obtained from VO with inversed scaling factor of x, as shown in Eq. (15).

$$y = \frac{|x_{max}|}{v_{bn}} \cdot VO \quad (15)$$

Description of an Alternate Embodiment of the Present Invention

D. Extended Method and Design for Auto-Associative Neural Network Recall Function The Brain-State-in-a-Box (BSB) model is a typical auto-associative neural network. The mathematical model of the BSB recall function can be represented as:

$$x(t+1) = S(\alpha \cdot A \cdot x(t) + \lambda \cdot x(t)) \quad (16)$$

where x is an N dimensional real vector, and A is an N-by-N connection matrix. A·x(t) is a matrix-vector multiplication operation, which is the main function of the recall function. α is a scalar constant feedback factor. λ is an inhibition decay constant. S(y) is the "squash"

$$S(y) = \begin{cases} 1, & \text{if } y \geq 1 \\ y, & \text{if } -1 < y < 1 \\ -1, & \text{if } y \leq -1 \end{cases} \quad (17)$$

For a given input pattern x(0), the recall function computes Eq. (16) iteratively until convergence, that is, when all entries of x(t+1) are either "1" or "−1".

Using the same method for general matrix-vector multiplication approximation described previously. Eq. (16) converts to:

$$x(t+1) = S(A^+ \cdot x(t) - A^- \cdot x(t) + x(t)) \quad (18)$$

Here, for the default case we set α=λ=1. The two connection matrices $A^+$ and $A^-$ can be mapped to two N-by-N memristor crossbar arrays $M_3$ 100 and $M_4$ 110 in a scaled version $\hat{A}^+$ and $\hat{A}^-$, respectively, by following the mapping method in Eq. (9) and Eq. (10).

To realize the BSB recall function at the circuit level, the normalized input vector x(t) is converted to a set of input voltage signals V(t). The corresponding function for the voltage feedback system can be expressed as:

$$V(t+1) = S'(\hat{A}^+ \cdot V(t) - \hat{A}^- \cdot V(t) + V(t)) \quad (19)$$
$$= S'(V_{A+}(t) - V_{A-}(t) + V(t))$$

$v_{bn}$ represents the input voltage boundary, that is, $-v_{bn} \leq v_i(t) \leq v_{bn}$ for any $v_i(t) \in V(t)$. The new saturation boundary function S'( ) needs to be modified accordingly as:

$$S'(v) = \begin{cases} v_{bn}, & \text{if } v \geq v_{bn} \\ v, & \text{if } -v_{bn} < v < v_{bn} \\ -v_{bn}, & \text{if } v \leq -v_{bn} \end{cases}$$

In implementation, $v_{bn}$ can be adjusted based on requirements for convergence speed and accuracy. Meanwhile, $v_{bn}$ must be smaller than $v_{th}$ so that the memristance values will not change during the recall process.

FIG. 4 illustrates the BSB recall circuit built based on Eq. (19). The design is an analog system consisting of three major components. The selector (switch) selects V(0) as input voltage at the start of the recall computation, then selects V(t+1) afterward. We assume that "t" is discretized time, so we have t=0, 1, 2, . . . . After the output voltages are all converged, we reset t to 0 so that the circuit takes the new input V(0) to be computed (recalled). Below is the detailed description.

Memristor Crossbar Arrays:

As the key component of the overall design, the memristor crossbar arrays 100, 110 are used to approximate the matrix-vector multiplication functions in the BSB recall operation. To obtain both positive and negative weights in the original BSB algorithm in Eq. (16), two N-by-N memristor crossbar arrays $M_3$ 100 and $M_4$ 110 are required in the design to represent the connection matrices $\hat{A}^+$ and $\hat{A}^-$, respectively. The memristor crossbar arrays have the same dimensions as the BSB weight matrix A transposed.

Summation-Subtraction Amplifiers:

In the present invention, the input signal $v_i(t)$ along with $v_{\hat{A}_{+,i}}(t)$ and $v_{\hat{A}_{-,j}}(t)$, the corresponding voltage outputs of two memristor crossbar arrays 100, 110, are fed into a summation-subtraction amplifier 80. The design of the summation-subtraction amplifier circuit 80 can be found in FIG. 5.

Resulting from the decayed mapping method, the required $v_{A_{+,i}}(t)$ and $v_{A_{-,j}}(t)$ should be $g_s/g_{max}$ times of the generated $v_{\hat{A}_{+,i}}(t)$ and $v_{\hat{A}_{+,j}}(t)$, respectively. In the present invention $R_1=R_4=R_6=1/g_s$ and $R_2=R_3=R_5=R_7=1/g_{max}$. The resulting output of the summation-subtraction amplifier 80 is:

$$v_i(t+1) = \frac{g_s}{g_{max}} \cdot v_{\hat{A}_{+,i}}(t) - \frac{g_s}{g_{max}} \cdot v_{\hat{A}_{-,i}}(t) + v_i(t) \qquad (20)$$
$$= v_{A_{+,i}}(t) - v_{A_{-,i}}(t) + v_i(t)$$

which indicates that the decayed effect has been canceled out. The N dimensional BSB model requires N summation-subtraction amplifiers 80 to realize the addition/subtraction operation in Eq. (20). Also, for the amplifiers, we should adjust their power supply levels to make their maximum/minimum output voltages to be equal to $\pm v_{bn}$, respectively. In the present invention the resistances $R_1$ through $R_7$ can be adjusted to match the required $\alpha$ and $\lambda$ in Eq. (16), if they are not the default value 1.

Comparator:

Once a new set of voltage signals $V(t+1)$ is generated from the summation-subtraction amplifiers 80, the present invention sends them back as the input of the next iteration. Meanwhile, each $v_i(t+1) \in V(t+1)$ is compared to $v_{bn}$ and $-v_{bn}$ so that when $v_i$ equals to either $v_{bn}$ or $-v_{bn}$, we deem the output i as having "converged". The recall operation stops when all N outputs reach convergence. In total, N comparators 90 are needed to cover all the outputs.

There are three major physical constraints in the circuit implementation: (1) For any $v_i(0) \in V(0)$, the voltage amplitude of initial input signal $v_i(0)$ is limited by the input circuit; (2) boundary voltage $v_{bn}$ must be smaller than $v_{th}$ of memristors 70; and (3) the summation-subtraction amplifier 80 has finite resolution.

In the BSB recall function, the ratio between boundaries of $S(y)$ and the initial amplitude of $x_i(0)$, $x_i(0) \in x(0)$ determines the learning space of the recall function. If the ratio is greater than the normalized value, the recall operation will take more iterations to converge with a higher accuracy. Otherwise, the procedure converges faster by lowering stability. Thus, minimizing the ratio of $|v_i(0)|$ and $v_{bn}$ can help obtain the best performance. However, the real amplifier has a finite resolution and $v_{bn}$ is limited within $v_{th}$ of the memristor 70. Continuously reducing $|v_i(0)|$ eventually will lose a significant amount of information in the recall circuit.

Having described preferred embodiments of the invention with reference to the accompanying drawings, it is to be understood that the invention is not limited to these precise embodiments, and that various changes and modifications may be affected therein by one skilled in the art without departing from the scope or spirit of the invention as defined in the appended claims.

What is claimed is:

1. An apparatus for performing matrix-vector multiplication approximation, comprising a first crossbar array of memristive devices for positive elements of a matrix;

a second crossbar array of memristive devices for negative elements of a matrix; wherein said first and said second crossbar array further comprise a plurality of word lines and a like plurality of bit lines with each of said word lines having an input and each of said bit lines having an output;

a subtraction amplifier having a positive input, a negative input, and an output;

said subtraction amplifier being connected to each corresponding pair of bit lines from said first and said second crossbar array, said subtraction amplifier having a positive input connected to an output of a bit line from said first crossbar array and having a negative input connected to an output of a corresponding bit line from said second crossbar array; and an output in common with said output of said subtraction amplifier, wherein when an input voltage vector is applied to said word lines, an output vector is produced at said output approximately according to $$VO = A \times VI$$

where VO represents said output voltage vector;

VI represents said input voltage vector, and

A represents a matrix with element values in the range of [−1.0, 1.0] being a function of the conductance of said memristive devices.

2. The apparatus for performing matrix-vector multiplication approximation of claim 1, wherein said each of the first and said second crossbar arrays further comprises a plurality of word lines intersecting a like plurality of bit lines, each of said plurality of word lines having an input end and each of said plurality of bit lines having an output end;

a plurality of memristive devices each having a first terminal and a second terminal, wherein one said memristive device is connected at each said intersection; and at each said intersection said first terminal of said memristive device is connected to said intersected word line and said second terminal of said memristive device is connected to said intersected bit line;

a sensing resistor connected between each said output end of each said bit line, and ground; and when an input voltage vector is applied to said word lines, an output vector is produced at said output approximately according to $$VO = C \times VI$$

where VO represents said output voltage vector;

VI represents said input voltage vector, and

C represents a matrix being a function of the conductance of said memristive devices.

3. The apparatus for performing matrix-vector multiplication approximation of claim 2, wherein said matrix C is defined by the expression $$C = D \times G = \mathrm{diag}(d_1, \ldots, d_M) \times \begin{bmatrix} g_{1,1} & \cdots & g_{1,N} \\ g_{2,1} & & g_{2,N} \\ \vdots & \ddots & \vdots \\ g_{M,1} & \cdots & g_{M,N} \end{bmatrix}$$

where

G represents a conduction matrix corresponding to the conductance of said plurality of memristive devices in said first or said second crossbar array; and D represents a diagonal matrix corresponding to the inverse of the summation of a row of said conduction matrix with the conductance of a sensing resistor.

4. The apparatus for performing matrix-vector multiplication of claim 3, wherein said diagonal matrix D further comprises matrix elements $d_i$ defined by the expression $$d_i = 1/(g_s + \Sigma_{k=1}^N g_{i,k})$$

where $g_s$ is the conductance of a sensing resistor; and
$g_{i,k}$ is the conductance of a memristive device.

5. The apparatus for performing matrix vector multiplication approximation of claim 1 wherein the conductance of said memristive devices in the first crossbar array is set by the expression:

$$g_{i,j} = \begin{cases} a_{i,j} \cdot (g_{max} - g_{min}) + g_{min}, & \text{if } a_{i,j} > 0.0 \\ g_{min}, & \text{if } a_{i,j} \leq 0.0 \end{cases}$$

And wherein the conductance of said memristive devices in the second crossbar array is set by the expression:

$$g_{i,j} = \begin{cases} -a_{i,j} \cdot (g_{max} - g_{min}) + g_{min}, & \text{if } a_{i,j} < 0.0 \\ g_{min}, & \text{if } a_{i,j} \geq 0.0 \end{cases}$$

where $g_{i,j}$ is the conductance of a memristive device;
$g_{min}$ and $g_{max}$ respectively represent the minimum and the maximum conductance of all said memristors in a crossbar array; and
$a_{i,j}$ are the elements of said matrix A of claim 1.

6. The apparatus for performing matrix-vector multiplication approximation of claim 1 wherein the voltage elements $vi_j$ of input voltage vector VI are constrained to an input voltage boundary defined by $$-v_{bn} \leq vi_j \leq v_{bn}$$

where $v_{bn}$ and $-v_{bn}$ are the upper and lower input voltage boundaries.

7. The apparatus for performing matrix-vector multiplication approximation of claim 6, wherein the absolute value of $v_{bn}$ and $-v_{bn}$ is less than $v_{th}$, where $v_{th}$ is the threshold voltage of said memristive devices.

8. An apparatus for performing auto-associative neural network recall function, comprising a first crossbar array of memristive devices for positive elements of a matrix;
a second crossbar array of memristive devices for negative elements of a matrix; wherein
said first and said second crossbar array further comprise a plurality of word lines and a like plurality of bit lines with each of said word lines having an input and each of said bit lines having an output;
a summation-subtraction amplifier having a positive input, a negative input, a feedback input, and an output;
said summation-subtraction amplifier positive and negative inputs being connected to each corresponding pair of bit lines from said first and said second crossbar array;
said summation-subtraction amplifier having a positive input connected to an output of a bit line from said first crossbar array and having a negative input connected to an output of a corresponding bit line from said second crossbar array; and
said summation-subtraction amplifier having said feedback input connected to its output and to an input to said apparatus;
a comparator having an input, and output, and a first and a second comparison input,
said comparator input being connected to said output of said summation-subtraction amplifier;
said first comparison input being connected to a positive boundary voltage;
said second comparison input being connected to a negative boundary voltage;
wherein said comparator outputs a "1" to indicate convergence when said comparator input voltage is equal to either said positive boundary voltage or said negative boundary voltage; and
an output in common with said comparator output, wherein when an input voltage vector is applied to said word lines, a convergence output vector is produced at said output approximately according to $$V(t+1) = S'(A \times V(t) + V(t))$$

where V(t+1) represents said convergence output voltage vector,
V(t) represents said input voltage vector; and
A represents a matrix with element values in the range of [−1.0, 1.0] being a function of the conductance of said memristive devices,
S'( ) is the saturation boundary function as follows:

$$S'(v) = \begin{cases} v_{bn}, & \text{if } v \geq v_{bn} \\ v, & \text{if } -v_{bn} < v < v_{bn} \\ -v_{bn}, & \text{if } v \leq -v_{bn} \end{cases}$$

9. The apparatus for performing auto-associative neural network recall function of claim 8, wherein said each of the first and said second crossbar arrays further comprises a plurality of word lines intersecting a like plurality of bit lines, each of said plurality of word lines having an input end and each of said plurality of bit lines having an output end;
a plurality of memristive devices each having a first terminal and a second terminal, wherein
one said memristive device is connected at each said intersection; and
at each said intersection said first terminal of said memristive device is connected to said intersected word line and said second terminal of said memristive device is connected to said intersected bit line; and
a sensing resistor connected between each said output end of each said bit line, and ground when an input voltage vector is applied to said word lines, an output vector is produced at said output approximately according to $$VO = C \times VI$$

where VO represents said output voltage vector;
VI represents said input voltage vector, and
C represents a matrix being a function of the conductance of said memristive devices.

10. The apparatus for performing auto-associative neural network recall function of claim 9, wherein said connection matrix C is defined by the expression $$C = D \times G = \text{diag}(d_1, \ldots, d_N) \times \begin{bmatrix} g_{1,1} & \cdots & g_{1,N} \\ g_{2,1} & & g_{2,N} \\ \vdots & \ddots & \vdots \\ g_{N,1} & \cdots & g_{N,N} \end{bmatrix}$$

where
G represents a conduction matrix corresponding to the conductance of said plurality of memristive devices in said first or said second crossbar array; and
D represents a diagonal matrix corresponding to the inverse of the summation of a row of said conduction matrix with the conductance of a sensing resistor.

11. The apparatus for performing auto-associative neural network recall function of claim 10, wherein said diagonal matrix D further comprises matrix elements $d_i$ defined by the expression $$d_i = 1/(g_s + \Sigma_{k=1}^{N} g_{i,k})$$

where
$g_s$ is the conductance of a sensing resistor; and
$g_{i,k}$ is the conductance of a memristive device.

12. The apparatus for performing auto-associative neural network recall function of claim 8 wherein the conductance of said memristive devices in the first crossbar array is set by the expression:

$$g_{i,j} = \begin{cases} a_{i,j} \cdot (g_{max} - g_{min}) + g_{min}, & \text{if } a_{i,j} > 0.0 \\ g_{min}, & \text{if } a_{i,j} \leq 0.0 \end{cases}$$

And wherein the conductance of said memristive devices in the second crossbar array is set by the expression:

$$g_{i,j} = \begin{cases} -a_{i,j} \cdot (g_{max} - g_{min}) + g_{min}, & \text{if } a_{i,j} < 0.0 \\ g_{min}, & \text{if } a_{i,j} \geq 0.0 \end{cases}$$

where
$g_{i,k}$ is the conductance of a memristive device;
$g_{min}$ and $g_{max}$ respectively represent the minimum and the maximum conductance of all said memristors in a crossbar array; and
$a_{i,j}$ are the elements of said connection matrix A of claim 8.

13. The apparatus for performing auto-associative neural network recall function of claim 8 wherein the voltage elements $vi_j$ of input voltage vector VI are constrained to an input voltage boundary defined by $$-v_{bn} \leq vi_j \leq v_{bn}$$

where $v_{bn}$ and $-v_{bn}$ are the upper and lower input voltage boundaries.

14. The apparatus for performing auto-associative neural network recall function of claim 13, wherein the absolute value of $v_{bn}$ and $-v_{bn}$ is less than $v_{th}$, where $v_{th}$ is the threshold voltage of said memristive devices.

15. The apparatus of claim 14 further comprising an input selector for
selecting V(0) as an input voltage at the start of a recall computation and selecting V(t+1) thereafter,
resetting t=0 after the convergence of all said output voltages; and
selecting a new input voltage V(0) for a recall computation.

16. The apparatus for performing matrix-vector multiplication of claim 15, wherein said first and said second comparison inputs are set to $v_{bn}$ and $-v_{bn}$, respectively.

17. The apparatus for performing matrix-vector multiplication of claim 16, wherein said comparator compares each of its positive and its negative outputs to said first and said second comparison inputs, respectively, to determine whether an output has converged.

* * * * *